US012795305B2

(12) United States Patent
Cui et al.

(10) Patent No.: US 12,795,305 B2
(45) Date of Patent: Nov. 10, 2026

(54) DIAPHRAGMLESS VISCOSITY-DRIVEN ACOUSTIC VELOCITY-SENSING MICROPHONE

(71) Applicant: The Research Foundation for the State University of New York, Albany, NY (US)

(72) Inventors: Weili Cui, Vestal, NY (US); Ronald Miles, Vestal, NY (US); Jaron Cui, Boston, MA (US)

(73) Assignee: The Research Foundation for the State University of New York, Albany, NY (US)

(*) Notice: Subject to any disclaimer, the term of this patent is extended or adjusted under 35 U.S.C. 154(b) by 195 days.

(21) Appl. No.: 18/754,629

(22) Filed: Jun. 26, 2024

(65) Prior Publication Data

US 2024/0430623 A1 Dec. 26, 2024

Related U.S. Application Data

(60) Provisional application No. 63/523,270, filed on Jun. 26, 2023.

(51) Int. Cl.
*H04R 19/04* (2006.01)
*H04R 31/00* (2006.01)

(52) U.S. Cl.
CPC .......... *H04R 19/04* (2013.01); *H04R 31/006* (2013.01)

(58) Field of Classification Search
CPC .... H04R 31/006; H04R 19/005; H04R 19/04; H04R 2201/003; H04R 3/06; G01F 1/56; G01F 1/58; G01F 1/584; G01F 1/34; G01F 1/28; G01F 1/22; G01F 1/64; B81B 3/0027; B81B 7/02; B81B 3/0086; B81B 2207/03; B81B 2203/04; B81B 2201/0264; B81B 2203/0127; B81B 2201/0257; G01L 19/02; G01L 19/06; G01L 9/0041; G01L 9/12
See application file for complete search history.

(56) References Cited

U.S. PATENT DOCUMENTS

2008/0101641 A1* 5/2008 Miles .................. H04R 23/006 381/369
2009/0016557 A1* 1/2009 Miles ..................... H04R 31/00 381/357
2019/0331531 A1* 10/2019 Glacer ................. G01N 29/341
2020/0277948 A1* 9/2020 Kutter .................. F04B 43/046

* cited by examiner

*Primary Examiner* — Carolyn R Edwards
*Assistant Examiner* — Julie X Dang
(74) *Attorney, Agent, or Firm* — Garrett M. Smith

(57) ABSTRACT

A microstructure that detects the acoustic velocity of a fluid by employing microfabricated thin sensing elements that are primarily driven by viscous forces due to the fluctuating motion of a fluid, such as air in a sound field. The microstructures can be fabricated in an array to create a diaphragmless microphone. The microstructure and its components can be fabricated on a single or multilayer substrate with the use of masks.

20 Claims, 4 Drawing Sheets

DIAPHRAGMLESS VISCOSITY-DRIVEN ACOUSTIC VELOCITY-SENSING MICROPHONE

CROSS-REFERENCE TO RELATED APPLICATION

This invention claims the benefit of U.S. Provisional Patent Application No. 63/523,270, filed on Jun. 26, 2023, the entirety of which is hereby incorporated herein by this reference.

STATEMENT REGARDING FEDERALLY SPONSORED RESEARCH

This invention was made with government support under grant number DC017720, awarded by the National Institutes of Health. The government has certain rights in the invention.

BACKGROUND OF THE INVENTION

1. Field of the Invention

The present invention generally relates to microphones and methods of their fabrication. More particularly, the present invention relates to diaphragmless microphones that are fabricated as microelectromechanical systems (MEMS) on a substrate.

2. Description of the Related Art

Microphones are designed to detect the fluctuating pressure in a sound field in a fluid, such as air or a liquid. In addition to fluid pressure, a sound field is characterized by fluctuations in the mean velocity of the air that is created by minute gradients in a fluctuating pressure field. Nearly all existing microphones, whether it is a condenser, a moving-coil, or a ribbon microphone, employ a thin flexible diaphragm that deflects in reaction to external sound pressure variations. The diaphragm is the essential part of a pressure-detecting microphone. The monitoring of the deflection of the diaphragm due to the sound pressure variation is the key step in converting acoustic energy to electrical energy.

There are also microphones based upon microelectromechanical systems, or MEMS, that are etched and manufactured on silicon and other substrates using techniques originally developed for integrated circuits. MEMS silicon microphones are in everything from cellphones, hearing aids, smart speakers, computers, and vehicles. The microphone element itself is under 1 mm in size and can be much smaller. Most come in surface-mount IC enclosures and include amplification circuitry with analog or digital outputs.

In general, a MEMS microphone is an electro-acoustic transducer housing a sensor and an application-specific integrated circuit (ASIC) in a single package. The sensor converts variable incoming sound pressure to capacitance variations that the ASIC transforms into an analog or digital output. An acoustic wave will enter the microphone through a physical sound inlet in the top or bottom of the package.

MEMS microphones can also use capacitive sensor technology. In such configuration, a thin, plated membrane in the silicon structure will vibrate with sound, creating a varying capacitance. The capacitor will have a second plate that is on a fixed surface in the silicon. A charge pump in the IC creates a high DC voltage for the capacitor and IC circuitry converts the capacitance changes to an electrical signal that is representative of the audio signal on the MEMS membrane. More recently, there have been MEMS microphones using piezoelectric sensing elements where motion of the piezoelectric element produces an audio voltage.

It is thus to the production of an improved diaphragmless MEMS microphone that provides superior performance that the present invention is primarily directed.

BRIEF SUMMARY OF THE INVENTION

Briefly described, the present invention provides a microstructure that detects acoustic velocity within a fluid by employing microfabricated, thin sensing elements that are primarily driven by viscous forces due to the fluctuating motion of air in a sound field. The sensing elements are designed thin enough so that the viscosity of the air plays a dominant role in causing their motion to be nearly identical to the surrounding air.

In one embodiment, the microstructure device uses a beam on a very compliant central pivot which allows a microstructure that can move with a velocity close to that of the surrounding air at frequencies near and above its mechanical resonance over a wide frequency range, despite the low viscosity and low density of air. The motion of the sensing elements can therefore closely represent the perturbations of the air around it.

The present microstructure architecture can provide an effective method for miniaturized flow sensing, surpassing the frequency response of hair-based flow sensors of animals. This invention is advantageous because it offers a new approach of miniaturized flow measurement and control in various mediums and situations. Since the air flow velocity vector generally has a direction parallel to the direction of sound propagation, this invention provides a method to accurately detect the orientation of a sound source. Through designing miniature super light-weight sensing elements with large surface areas on a microstructure with very compliant central pivots and combining the sound wave propagation characteristics over a small cavity with essentially incompressible air, the present invention can provide a miniature, directional, broadband, passive, fabrication friendly approach to detect acoustic waves with high fidelity over a wide frequency range.

In one embodiment, the present invention provides a semiconductor device for sensing acoustic velocity within a fluid, with the device formed on a substrate, and there is a cavity in the substrate, with the cavity configured to allow a predetermined rate of fluid flow therewithin. There is a measurement component held within the cavity, and the measurement component is configured to change a capacitance based upon a predetermined acoustic velocity of the fluid flow with the cavity. Further, there is a sensor communicatively coupled with the measurement component, where the sensor detects changes in the capacitance of the measurement component that correspond to the predetermined acoustic velocity of fluid flow within the cavity.

In embodiments, the sensor can further determine a vector acoustic particle velocity of the fluid flow within the cavity, and the measurement component can be an elastically deformable beam that changes capacitance with deformation. Further, the measurement component can be an acoustically transparent microstructure made of a torsional beam having two opposing ends and a central platform in the middle thereof, and a first sensing area on one end of the beam and a second sensing area on the opposing end of the beam. There is also a pivot located in the cavity, the pivot supporting the middle of the beam.

Additionally, the substrate can have a top surface plane and the measurement component has a top surface, and the top surface of the measurement component is in the same plane as the top surface plane of the substrate. In such embodiment, the measurement component can further detect a sound wave that travels parallel to the top surface of the measurement component in the cavity. And the substrate can be made of a bottom semiconductor layer and a top layer of Si on the bottom semiconductor layer.

In an embodiment, the invention can include a microphone made form an array of semiconductor devices for sensing acoustic velocity within a fluid described above. The sensor is communicatively coupled with the measurement components of the array of semiconductor devices, the sensor detecting changes in the capacitance of the measurement components that correspond to the predetermined acoustic velocity of fluid flow within the cavity, the predetermined acoustic velocity indicative of a predetermined frequency of sound.

In this embodiment, each cavity has a direction of fluid flow and each measurement component can be further configured to detect a sound wave that travels parallel to the top surface of each measurement component in the cavity to thereby determine a direction of the sound wave. And if the fluid is air, and the cavity can be further configured such that air therewithin is incompressible.

In one embodiment, the invention includes a method of fabricating a semiconductor device for sensing acoustic velocity within a fluid by creating a first set of features on a substrate with a first mask, the first set of features including a cavity in the substrate with the cavity configured to allow a predetermined rate of fluid flow therewithin. The method then includes creating a second set of features on the substrate with a second mask with the second set of features including a measurement component that is held within the cavity, the measurement component configured to change a capacitance based upon a predetermined acoustic velocity of the fluid flow with the cavity, and a sensor communicatively coupled with the measurement component, with the sensor detecting changes in the capacitance of the measurement component that correspond to the predetermined acoustic velocity of fluid flow within the cavity.

The present invention therefore provides an advantage in providing an improved diaphragmless microphone that can use the acoustic velocity of a fluid to detect sound and pressure. The present invention is also industrially applicable in that it allows an improved MEMS microphone and method of its manufacture. Other objects, advantages, and features of the present invention will become apparent to one of skill in the art after review of the present application.

DETAILED DESCRIPTION OF THE INVENTION

Figure 1A:
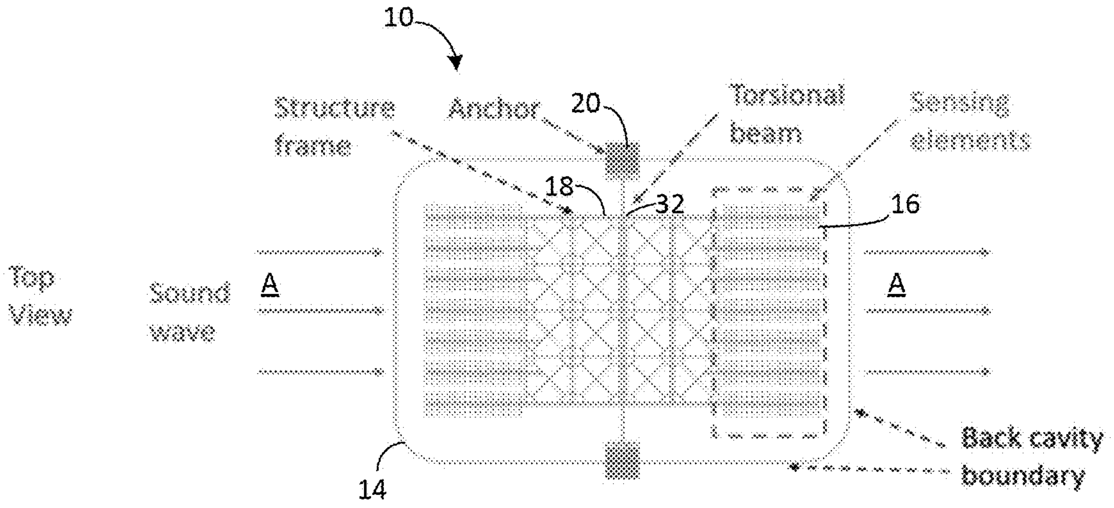
FIG. 1A is top view an array of semiconductor devices in a cavity that senses a sound wave traveling thereacross.
Figure 1B:
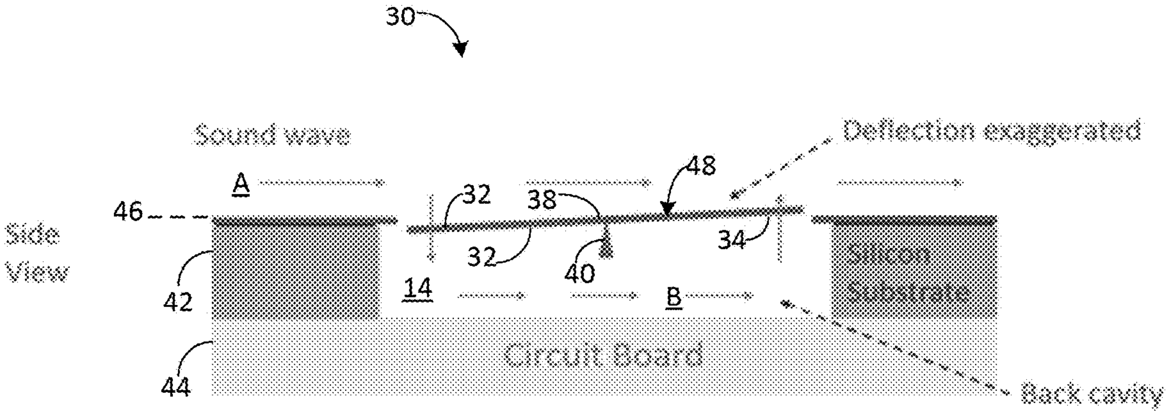
FIG. 1B is a side view of one embodiment of a single semiconductor device with a deflecting beam in the cavity, with a particle flow within the cavity.

With reference to the figures in which like numerals represent like elements throughout the several views, FIG. 1A is top view of an array 10 of semiconductor devices in a cavity 14 that senses a sound wave traveling thereacross, and FIG. 1B is a side view of one embodiment a single semiconductor device 30 with a deflecting beam 32 in the cavity, with a particle flow within the cavity. FIG. 1A shows the array 10 with miniature super light-weight sensing elements 16 with large surface areas on a microstructure 18 with very compliant central pivots (pivot 40; FIG. 1B), with the microstructure 18 held to a substrate 14 (FIG. 1B) and combining the sound wave propagation characteristics over a small cavity 14 with incompressible air, such as via sound wave shown by Arrows A. One or more sensors 20 will communicate electrical signals from the torsional beam 32. The present invention therefore provides a miniature, directional, broadband, passive, fabrication friendly approach to detect acoustic waves with high fidelity over a wide frequency range.

The microstructure only accounts for about 10% of the total area so the pressure variations across the front and back side is minute. The microstructure is designed to be low mass and highly compliant in its dominant mode to maximize the effects of viscosity on their motion and provide the sensitivity of an ideal resonator. To transduce the motion of the sensing elements into an electronic signal, stationary elements positioned at a small distance from the sensing elements are utilized.

In one embodiment, as shown in FIG. 1B, the invention includes a semiconductor device 30 for sensing acoustic velocity within a fluid, such as air or a liquid like water, where the device 30 is formed at least on a substrate 42, and there is a cavity 14 in the substrate 42, with the cavity 14 configured to allow a predetermined rate of fluid flow therewithin, as shown by the flow indicated by Arrows B. Here, the substrate 42 is actually a top layer of Si that is formed over a lower semiconductor layer 44, which is here is a circuit board to implement digital control, logic, and signaling. There is a measurement component held within the cavity 14, shown in this embodiment as a seesaw beam 32, and the measurement component is configured to change a capacitance based upon a predetermined acoustic velocity of the fluid flow (Arrows B) within the cavity 14. Further, there is a sensor 20 communicatively coupled with the measurement component, or here the torsional 32, beam where the sensor 20 detects changes in the capacitance of the measurement component that correspond to the predetermined acoustic velocity of fluid flow within the cavity 14.

Unlike conventional microphones having solid pressure-sensing diaphragms, here, there are microfabricated thin beams that form this acoustically transparent structure that is anchored only at its central pivot 40. The absence of a diaphragm makes the present device insensitive to slowly varying pressure variations such as those due to weather.

Thus, it is not subjected to the many disadvantages and limitations that are typical to regular pressure sensing microphones.

It is designed to respond to vector acoustic particle velocity due to viscous forces, not by pressure differences across a flexible diaphragm. The sensing elements in this device are designed to be driven by viscous forces such that its velocity closely resembles the acoustic particle velocity, which makes it inherently directional. This can be very advantageous in systems that are intended to reduce the effects of background noise.

A high bias voltage can be employed in a capacitive sensing scheme since it does not have a backplate positioned a small distance from a flexible diaphragm, as is done with conventional microphones. Further, the present device 30 does not have the negative influence due to squeeze film damping, which plagues typical pressure-sensing microphones.

The structure of this device 30 has a flat, uniform response over a wide frequency range above its lower cutoff frequency. The lower cutoff frequency is strongly influenced by the dimensions of the backside cavity 14 and the mechanical stiffness of the torsional beam 32, which can be adjusted. The response drops quickly below the cutoff frequency, which makes the device 30 insensitive to low frequency perturbations, and thus, the device 30 is very robust against wind and low frequency vibration and noise.

The measurement component is fabricated in the plane 46 of the substrate 42. And in one embodiment, the sound wave comes in the direction parallel to the sensing elements 16 along the surface of the chip, as shown by Arrows A. This differs from other hair-based flow sensors that have vertical hairs or beams that are perpendicular to the device chip surface. This reduces the possibility of particle contamination from the air. Wind does not flow through the structure so that it is protected from wind forces and wind noise. The structure of the measurement component is inside a cavity 14 with incompressible air that acts like a protective cushion so that it is also very robust against low frequency vibration.

In embodiments, the sensor 20 can further determine a vector acoustic particle velocity of the fluid flow within the cavity 14, and the measurement component can be an elastically deformable cantilever beam that changes capacitance with deformation. In such configuration, the beam would be fixed to the substrate 42 at a point and deflect from physical stress.

Alternately, the measurement component can be an acoustically transparent microstructure made of a torsional beam 32 having two opposing ends, and a central platform 38 in the middle thereof, and a first sensing area 32 on one end of the beam 32 and a second sensing area 34 on the opposing end of the beam 32. There is also a pivot 40 located in the cavity 14, with the pivot 40 supporting the middle of the beam 32. As shown in FIG. 1A, each sensing area has a number of sensing units with an array of thin microfabricated beams attached perpendicularly to two center beams (torsional beam 32). The center beams are attached to the central platform. The fundamental frequency of this structure can be tuned by adjusting the parameters of the central torsional beams 32. The first mode is an out-of-phase rigid body mode rotating about the central pivot 40. The second mode is designed to be at a much higher resonant frequency than the first one so that there is only one dominant mode in the frequency range of interest.

Additionally, the substrate 42 can have a top surface plane 46 and the measurement component has a top surface 48, and the top surface 46 of the measurement component is in the same plane as the top surface plane 46 of the substrate. In such embodiment, the measurement component can further detect a sound wave that travels parallel to the top surface of the measurement component in the cavity 14, such as the sound wave shown by Arrows A. And the substrate 42 can be made of a bottom semiconductor layer 44 and a top layer of Si on the bottom semiconductor layer.

Figure 2:
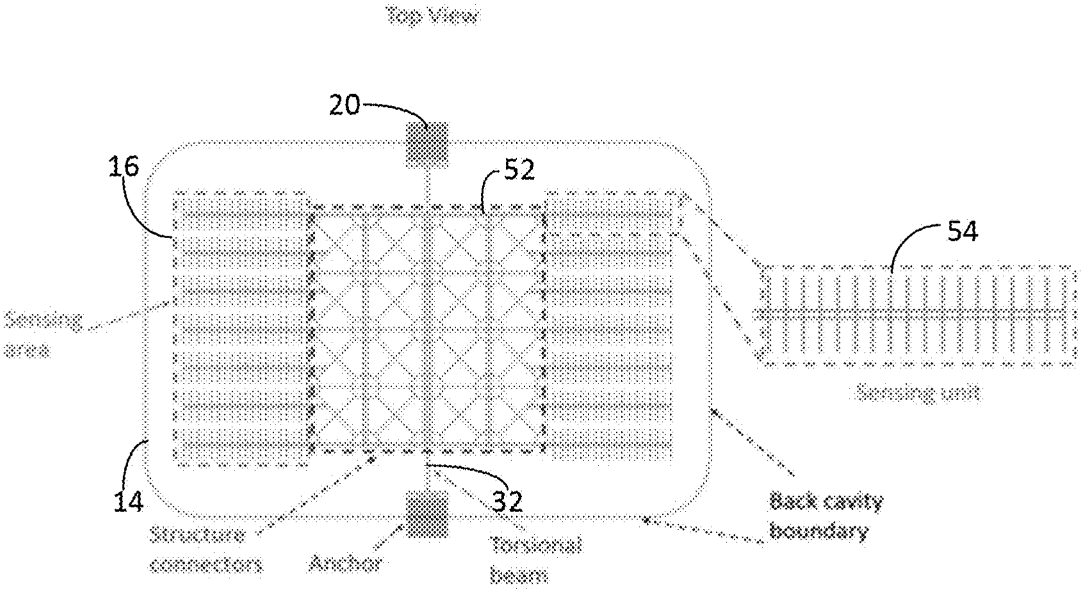
FIG. 2 is a top view of one embodiment of the sensing structure of the velocity sensing microphone

FIG. 2 is a top view of one embodiment of the sensing structure of the velocity sensing microphone. Highlighted are the structure connectors 52 that connect each of the sensing units 54. The sensor 20 also serves as the anchoring point 20 for the torsional beam 32 in this embodiment.

Figure 3:
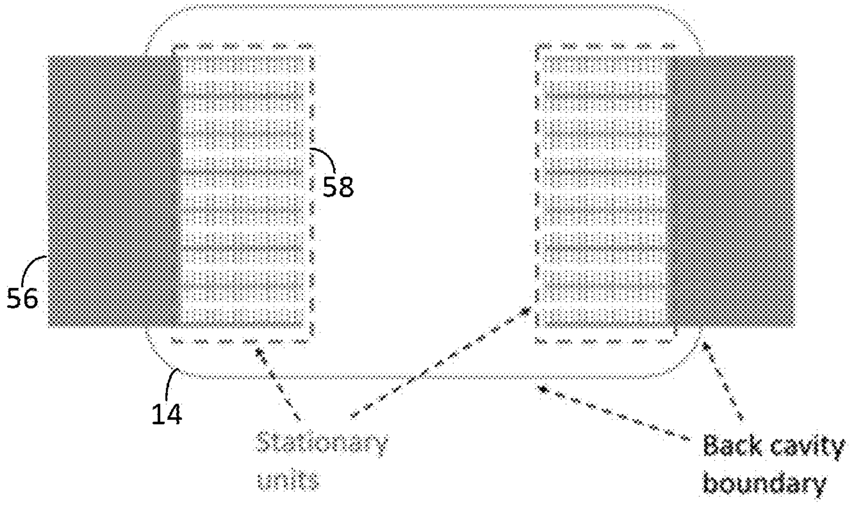
FIG. 3 is a top view of the fixed-electrode structure that is utilized to employ capacitive sensing.
Figure 4:
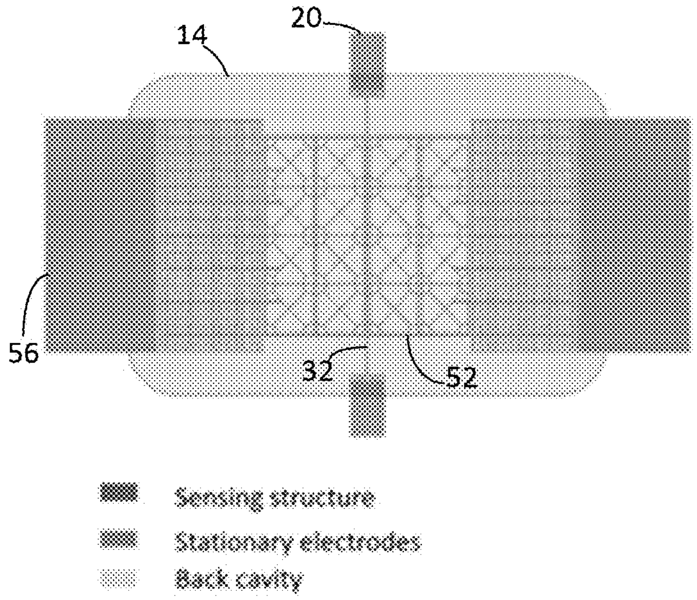
FIG. 4 shows both the sensing structure along with the fixed-electrode structure.

FIG. 3 is a top view of the fixed-electrode structure that is utilized to employ capacitive sensing. The fabrication of the fixed electrode structure 56 includes the stationary units 58 for the sensing array, the stationary units sit under the moving beams of as is shown in FIG. 4. The fabrication of the fixed-electrode structure can occur as a separate manufacturing step or can occur in the same step with an initial mask on the substrate 42.

FIG. 4 is a top view of the microphone array showing both the sensing structure 52 along with the fixed-electrode structure 56. The sensing structure 52 will pivot about the torsion beam 32 and proximate to the stationary electrodes 56. The sensing structure 52 can fabricated with a second mask or process step over the fixed-electrodes 56, or can be fabricated in multiple steps.

Figure 5:
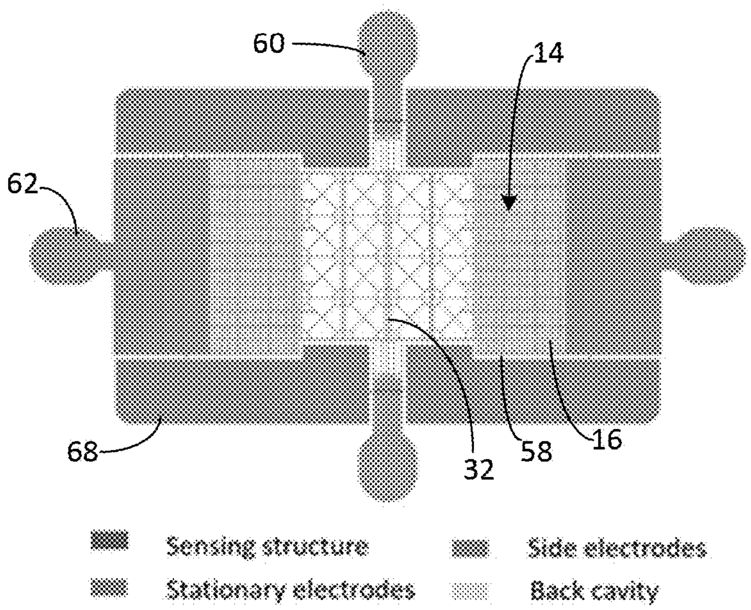
FIG. 5 shows the sensing, fixed electrode, and the side electrode structures. The side electrodes could be used for actuation or attenuation.

FIG. 5 shows the finished microphone array with a sensor electrode 60, fixed electrode 62, and the side electrode 68 structures. The side electrodes 68 could be used for actuation or attenuation. Thus, in finished form, the integrated microphone components provide external electrical connections, i.e. sensor electrode 60 and fixed electrode 62, for passing signals from deflections sensed on the torsional beam 32. The cavity 14 still remains exposed under the stationary electrodes 58 and sensing area 16 such that air can flow across the sensing area 16.

Figure 6:
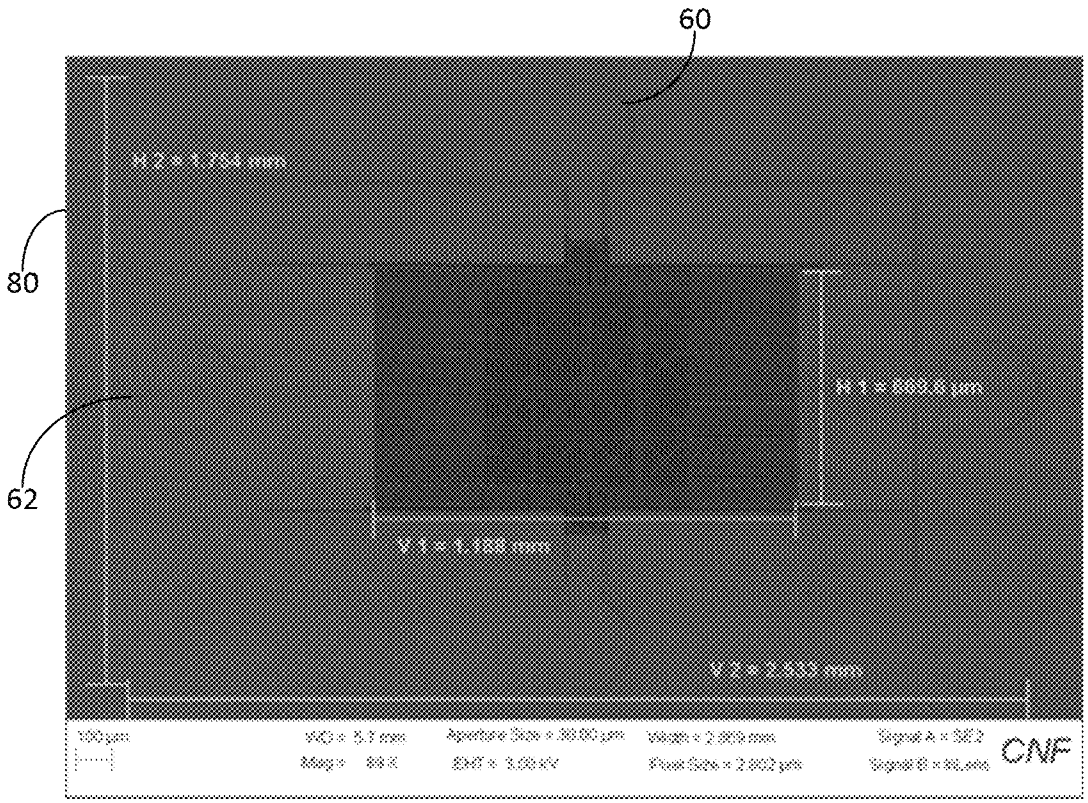
FIG. 6 is a SEM (Scanning Electron Microscope) image of a micro-manufactured velocity sensing microphone as specified in FIGS. 2-5.

FIG. 6 is a SEM (Scanning Electron Microscope) image 80 of a micro-manufactured velocity sensing microphone as specified in FIGS. 2-5. The sensing electrode 60 and stationary electrode 62 are illustrated. As shown, the device has full dimensions of approximately 1.75 mm by 2.53 mm, with the sensing structure of about 670 μm by 1.18 mm.

Figure 7:
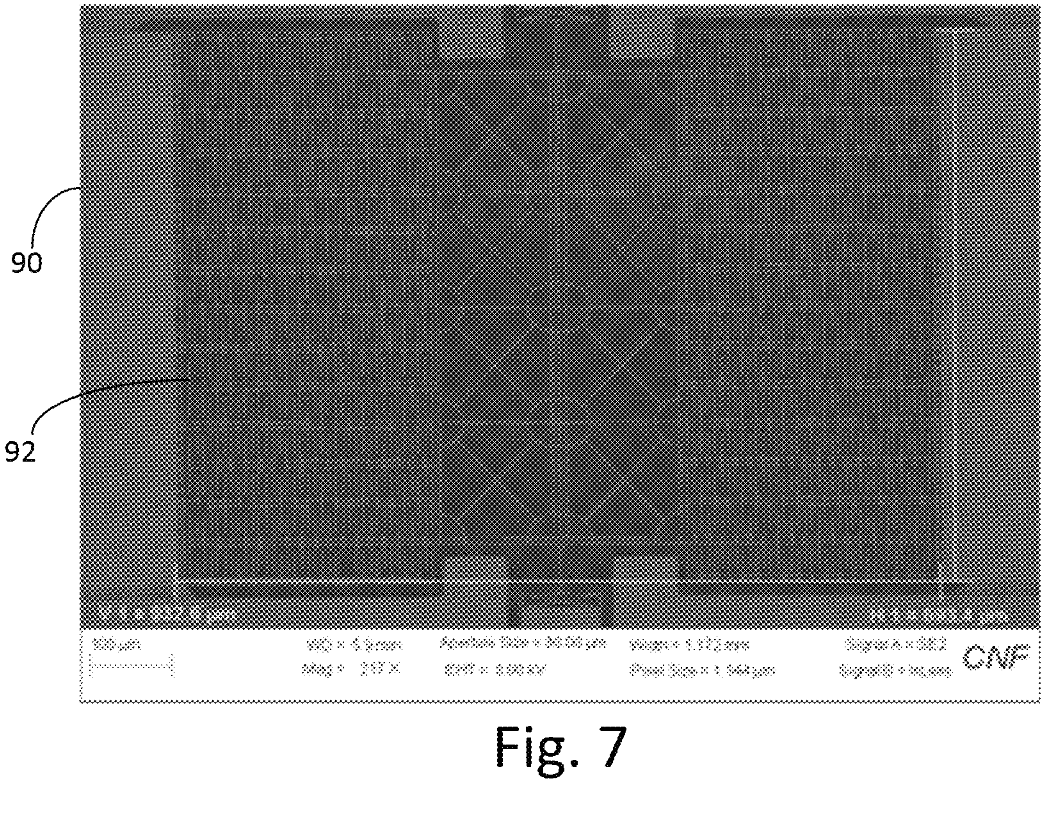
FIG. 7 is the SEM image of an alternate embodiment of the micro-manufactured velocity sensing microphone with fixed components and deforming cantilevered beams.

FIG. 7 is the SEM image 90 of an alternate embodiment of the micro-manufactured velocity sensing microphone with fixed components 92 of deforming cantilevered beams. In this configuration the sensing area is about 1×1 mm. It should be appreciated that several different type of individual devices, e.g. seesaw beams 32

Accordingly, in one embodiment, the invention can include a microphone formed from an array of semiconductor devices, such as device 30, for sensing acoustic velocity within a fluid described above. As shown in FIG. 5, a sensor 20 is communicatively coupled with the measurement components of the array of semiconductor devices in the cavity 14, and the sensor detects changes in the capacitance of the measurement components, such as the torsional beam 32, that correspond to the predetermined acoustic velocity of fluid flow within the cavity 14, with the predetermined acoustic velocity indicative of a predetermined frequency of sound, which can be high, medium, or low audible range, or other desired sound wave characteristics.

As shown in FIG. 1B, each cavity 14 has a direction of fluid flow (arrows A) and each measurement component can be further configured to detect a sound wave that travels parallel to the top surface 48 of each measurement component in the cavity 14 to thereby determine a direction of the sound wave. And if the fluid is air, and the cavity 14 can be further configured such that air therewithin is incompressible. This mitigates against noise occurring in the cavity 14 and allows for a more accurate reading.

One advantage of the present invention is that it can be fabricated with silicon microfabrication using only two masks. This fabrication method greatly reduces the influence of intrinsic stress and simplifies the fabrication procedures. The sensing elements (FIG. 2) and fixed elements (FIG. 3) can each be defined with one single mask, which eliminates alignment errors.

Thus, in one embodiment, the invention includes a method of fabricating a semiconductor device 30 for sensing acoustic velocity within a fluid by creating a first set of features on a substrate with a first mask, in the substrate 42 with the cavity 14 configured to allow a predetermined rate of fluid flow therewithin. The first mask can also include the components of the measurement fixed electrode structure 56 includes the stationary units 58 for the sensing array. The method then includes creating a second set of features on the substrate 42 with a second mask with the second set of features including, at least, the at least including a cavity 14. The measurement component is held within the cavity 14, such as seesaw beam 32 and pivot 40. The sensing components can also include the sensor 20 that is communicatively coupled with the measurement component, such as through torsional beam 32, with the sensor 20 detecting changes in the capacitance of the measurement component that correspond to the predetermined acoustic velocity of fluid flow within the cavity.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A device for sensing acoustic velocity within a fluid, comprising:

a substrate;

a cavity formed in the substrate using a mask, the cavity configured to allow a predetermined rate of fluid flow therewithin in a predetermined direction of flow;

a measurement component held within the cavity, the measurement component configured to change a capacitance based upon a predetermined acoustic velocity of the fluid flow within the cavity; and a sensor communicatively coupled with the measurement component, the sensor detecting changes in the capacitance of the measurement component that correspond to the predetermined acoustic velocity of fluid flow within the cavity, the predetermined acoustic velocity indicative of a predetermined frequency of sound.

2. The device of claim 1, wherein the sensor further determining a vector acoustic particle velocity of the fluid flow within the cavity.

3. The device of claim 1, wherein the measurement component is an elastically deformable beam that changes capacitance with deformation.

4. The device of claim 1, wherein:

the measurement component is an acoustically transparent microstructure comprised of:

a torsional beam having two opposing ends and a central platform in a middle thereof; and a first sensing area on one end of the beam and a second sensing area on the opposing end of the beam; and further including a pivot located in the cavity, the pivot supporting the middle of the beam.

5. The device of claim 1, wherein the substrate has a top surface plane and the measurement component has a top surface, and the top surface of the measurement component is in a same plane as the top surface plane of the substrate.

6. The device of claim 5, wherein the measurement component further configured to detect a sound wave that travels parallel to the top surface of the measurement component in the cavity.

7. The device of claim 1, wherein the sensor detects a fluid pressure on the measurement component.

8. The device of claim 1, wherein the substrate is comprised of:

a bottom semiconductor layer; and a top layer of Si on the bottom semiconductor layer.

9. A microphone, comprising:

an array of semiconductor devices for sensing acoustic velocity within a fluid, each semiconductor device comprising:

a substrate;

a cavity in the substrate, the cavity configured to allow a predetermined rate of fluid flow therewithin in a predetermined direction of flow; and a measurement component held within the cavity, the measurement component configured to change a capacitance based upon a predetermined acoustic velocity of the fluid flow within the cavity; and a sensor communicatively coupled with the measurement components of the array of semiconductor devices, the sensor detecting changes in the capacitance of the measurement components that correspond to the predetermined acoustic velocity of fluid flow within the cavity, the predetermined acoustic velocity indicative of a predetermined frequency of sound.

10. The microphone of claim 9, wherein the sensor further determining an acoustic particle velocity of the fluid flow within each cavity.

11. The microphone of claim 9, wherein each measurement component is an elastically deformable beam that changes capacitance with deformation.

12. The microphone of claim 9, wherein each measurement component is an acoustically transparent microstructure comprised of:

a torsional beam having two opposing ends and a central platform in a middle thereof;

a first sensing area on one end of the beam and a second sensing area on the opposing end of the beam; and further including a pivot located in the cavity, the pivot supporting the middle of the beam.

13. The microphone of claim 9, wherein the substrate has a top surface plane and each measurement component has a top surface, and the top surface of each measurement component is in a same plane as the top surface plane of the substrate.

14. The microphone of claim 9, wherein each cavity has a direction of fluid flow.

15. The microphone of claim 13, wherein each measurement component further configured to detect a sound wave that travels parallel to the top surface of each measurement component in the cavity to thereby determine a direction of the sound wave.

16. The microphone of claim 9, wherein the sensor further detects a fluid pressure on each measurement component.

17. The microphone of claim 9, wherein the substrate is comprised of:

a bottom semiconductor layer;

a top layer of Si on the bottom semiconductor layer; and wherein each cavity is formed in the top layer of Si.

18. The microphone of claim 9, wherein the fluid is air, and the cavity is further configured such that air therewithin is essentially incompressible.

19. A method of fabricating a semiconductor device for sensing acoustic velocity within a fluid, comprising:

creating a first set of features on the substrate with a first mask, the first set of features including:

a measurement component configured to change based upon a predetermined acoustic velocity of the fluid flow; and a sensor communicatively coupled with the measurement component, the sensor detecting changes in the measurement component that correspond to the predetermined acoustic velocity of fluid flow within the cavity; and creating a second set of features on a substrate with a second mask, the second set of features including a cavity in the substrate, the cavity configured to allow a predetermined rate of fluid flow therewithin.

20. The method of claim 19, wherein the substrate is comprised of a bottom semiconductor layer and a top layer of Si on the bottom semiconductor layer; and creating the first set of features with the first mask is creating the first set of features in the top layer of Si; and creating the second set of features with the second mask is creating the second set of features on the top layer of Si.

* * * * *